Figure 1:
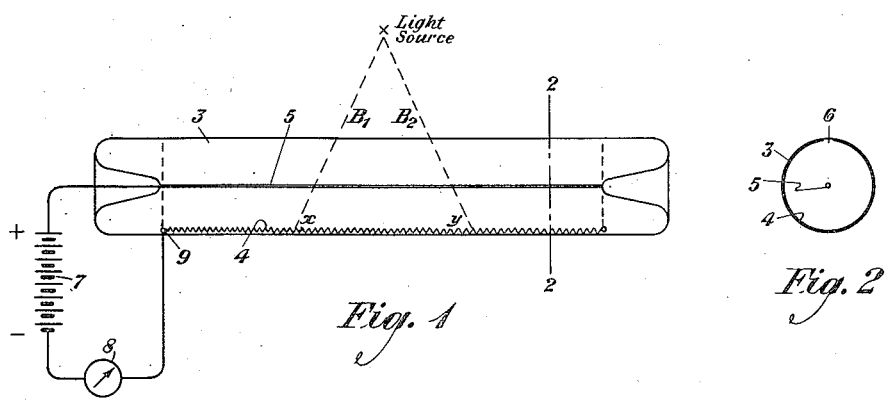

Oct. 7, 1930.  R. K. POTTER  1,777,378
PHOTO ELECTRIC CELL
Filed Sept. 8, 1926

INVENTOR
*R. K. Potter*
BY
*ATTORNEY*

Patented Oct. 7, 1930

1,777,378

UNITED STATES PATENT OFFICE

RALPH K. POTTER, OF NEW YORK, N. Y., ASSIGNOR TO AMERICAN TELEPHONE AND TELEGRAPH COMPANY, A CORPORATION OF NEW YORK

PHOTO-ELECTRIC CELL

Application filed September 8, 1926. Serial No. 134,300.

This invention relates to photo-electric cells, and more particularly to photo-electric cells having a photo-sensitive cathode, an anode, a source of voltage connected between the electrode terminals, and a gas content allowing ionization by collision.

In the usual form of photo-electric cell of this type, the output of the cell is proportional to the quantity or intensity of the incident light. It is the object of this invention to provide a satisfactory photo-electric cell which is responsive not only to variation in the quantity of the light but also to the displacement of an incident light beam of constant intensity. Such a cell is advantageous, especially in certain reproduction methods in which it obviates the necessity of including special optical means as a part of the device.

In general the cell embodying my invention is so arranged that the accelerating field over the region between the sensitive area of the cathode and the anode is graduated, the magnitude of the effective accelerating field being different for different positions of the light beam.

If the accelerating field between the electrodes of a photo-electric cell is sufficient to remove all of the electrons as fast as they are released from the cathode by an incident light beam, and if there is no gas present in the cell envelope, the output will depend solely upon the quantity of light. There will be no change in the output current with an increase of the anode potential. If, however, gas is present in the tube, the output is no longer a simple function of the quantity of incident light but depends upon the kind of gas, its pressure and temperature, the electrode spacing, and the strength of the accelerating field. The electrons released by the photo-electric action cause ionization of the gas if the mean free path of the gas molecules is shorter than the path between the electrodes and if the accelerating field is strong enough to give an electron a sufficient velocity before it strikes. In familiar types of cell, many collisions take place in the distance between the cathode and the anode. Since each collision releases more electrons, the action is cumulative. The total output current of a photo-electric cell of such type may be represented by the following relation:

$$i = i_0 \epsilon [pdN\epsilon^{(-NVpd/E)}]$$

in which $i_0$ is the current due to photo-electric effect alone, $\epsilon$ is natural logarithmic base (constant),
$p$ is the pressure of the gas in the cell,
$d$ is the distance between the electrodes,
$N$ and $V$ are the ionization constants, and
$E$ is the potential between the electrodes.

The form of photo-electric cell described in detail hereinafter is shown in Figure 5 of my application filed as of even date herewith and numbered 134,298, but is not specifically claimed therein.

Figure 2:
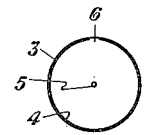

My invention will be more clearly understood when the following description is read with reference to the accompanying drawing. Figure 1 of the drawing shows the cell in longitudinal section, and Fig. 2 is a cross-sectional view of the cell taken on the line 2—2 of Fig. 1. Like numerals of reference in the two figures of the drawing designate corresponding parts of the device.

The electrodes of the cell are contained in an evacuated envelope. The cathode 4 is of a light-sensitive material, and is made highly resistive, as is indicated by the diagrammatic showing of the cathode in Fig. 1 of the drawing. The anode 5 is in the form of a wire conductor and has a negligible resistance. The light beam enters through the slit or window 6, shown in Fig. 2 of the drawing. A battery 7 is connected across the terminals of the cathode 4, and a meter 8 is connected in series therewith.

The point at which the light beam falls upon the cathode determines the strength of the accelerating field. The resultant potential between the anode and the cathode is that due to the battery 7 minus the potential drop from the cathode terminal 9 to the sensitized point of the cathode. If the light beam is in the position $B_1$, falling upon the cathode at the point $x$, the resultant potential is the voltage of the battery 7 minus the potential drop from the cathode terminal 9 to the point $x$. If the light beam takes the position $B_2$, the resultant potential is the voltage of the battery minus the potential drop from the terminal 9 to the point $y$.

It is to be noted that the action of the cell depends upon a variation of "E" of the relation stated above.

It is to be understood that the form of the evacuated cell may be changed and other structural changes from the specific showing of the drawing may be made within the scope of the appended claims without a departure from the spirit of the invention.

What is claimed is:

In a photo-electric cell, an envelope, a light-sensitive cathode therein having high ohmic resistance, said envelope being adapted to admit a beam of light to fall upon said cathode at different points over a substantial range of displacement of the beam, an anode, and a source of potential connected between one end of said cathode and said anode, whereby the effective potential between the cathode and the anode for any given position of the light beam is the potential of said source minus the voltage drop between the connected end of the cathode and the point thereon sensitized by the incidence of the light beam in the given position.

In testimony whereof, I have signed my name to this specification this 4th day of September, 1926.

RALPH K. POTTER.